Dec. 18, 1951     R. J. BALDWIN     2,579,028
HYDRAULIC POWER UNIT FOR ACTUATING
AIRCRAFT CONTROL DEVICES
Filed Jan. 10, 1948

INVENTOR
Robert J. Baldwin
By Carr & Carr & Gravely,
HIS ATTORNEYS

Patented Dec. 18, 1951

2,579,028

UNITED STATES PATENT OFFICE 2,579,028

HYDRAULIC POWER UNIT FOR ACTUATING AIRCRAFT CONTROL DEVICES

Robert J. Baldwin, St. Louis County, Mo., assignor to McDonnell Aircraft Corporation, St. Louis, Mo., a corporation of Maryland Application January 10, 1948, Serial No. 1,615

8 Claims. (Cl. 121—41)

1

This invention relates to pressure fluid motors and is more particularly directed to a pressure fluid motor useable in aircraft for the adjustment of control surfaces thereof.

One of the objects of this invention is the provision of a pressure fluid motor irreversibly operable so that when connected to a control surface it will prevent flutter in such surface.

Another object of the invention is the provision of a pressure fluid motor useable for the operation of an aircraft control surface that will permit the surface to be manually operated and all so constructed and arranged so that they are irreversible whether the control surface is manually or motor adjusted.

A further object of the invention is the provision of a pressure fluid motor to operate a control member that may also be manually operated and which has a minimum of lost motion in follow-up operation in the event of power failure when manual operation is required to operate the control member.

Figure 1:
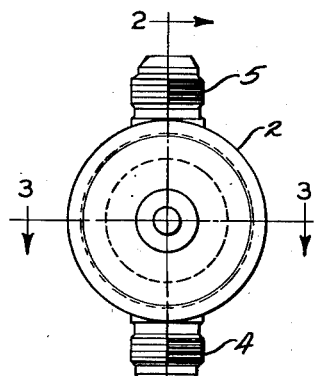
Fig. 1 is an end elevational view of the pressure fluid motor.

Referring now to the drawings, numeral 1 designates the cylinder for the improved motor that is provided with apertured closures 2 and 3 in which suitable packings are inserted to prevent loss of pressure fluid past a rod movable therein. The cylinder 1 is provided with inlet and outlet fixtures 4 and 5, respectively, which may also serve as trunnions so that the cylinder 1 may be rotated about its minor axis.

A piston 6 is arranged within the cylinder 1 for movement relative thereto along the major axis of the cylinder. Relative rotative motion between the piston and the cylinder about their longitudinal or major axes is prevented by a pin 7 secured in cylinder 1 whose lower end or tip extends into a surface groove cut into piston 6 that extends longitudinally thereof.

A driven rod 8 is secured in one end of the piston 6. This rod is provided with an enlargement or head 9 that is threaded into the piston 6 and extends through an opening in cap 3 and the seal therein. The rod 8 is connected to the part to be moved or adjusted. A driving or valve rod 10 extends through the cap 2 and the seal

2 therein. The rod 10 has two spaced valve members 11 and 12 thereon that are slidably disposed in a bore in piston 6 formed between wall 13 and head 9. The rod 10 is also slidably received in a bore formed in head 9 with provision therein to prevent pressure fluid leakage. The rod 10 is under the control of the operator or pilot either directly or through suitable mechanical devices. Springs 14 and 15 are disposed between wall 13 and valve 11 and valve 12 and head 9, respectively, whose functions will be subsequently set forth.

Figure 2:
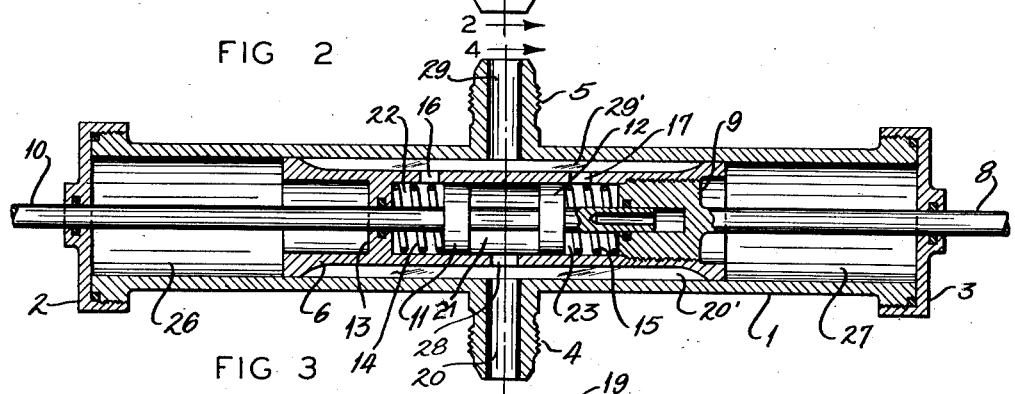
Fig. 2 is a sectional view taken substantially along the line 2—2 of Fig. 1.
Figure 3:
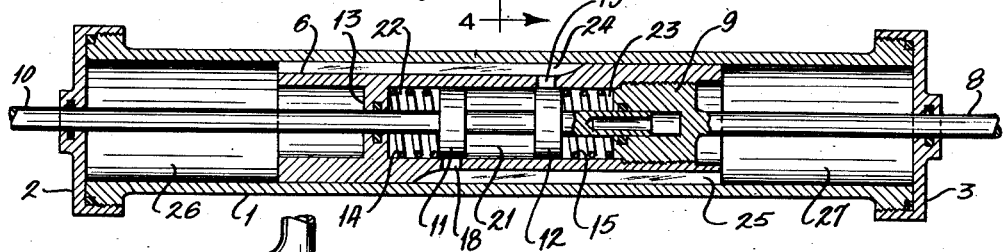
Fig. 3 is a sectional view taken substantially along the line 3—3 of Fig. 1.
Figure 4:
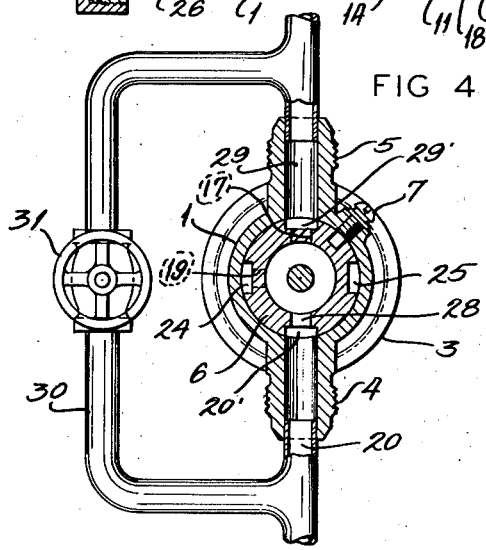
Fig. 4 is a sectional view taken substantially along the line 4—4 of Fig. 2.

A plurality of ports are cut in the piston 6 that cooperate with suitable passageways formed on the surface of piston 6 so that communication can be established between inlet 20 and chambers 26 and 27 and outlet 29 or to prevent flow of fluid. Fluid flows from inlet port 20 into longitudinal groove 20' thence through port 28 into chamber 21 formed between valves 11 and 12 in piston 6. When the valves are in the position shown in the drawings no motion will occur between cylinder 1 and piston 6. The piston 6 is provided with ports 16, 17, 18 and 19 positioned as shown in Figs. 2 and 4, the former employable for the purpose of establishing communication between chambers 22 and 23 with the exhaust port 29 through surface channel 29' and the latter ports selectively establishing communication between chamber 21 and the chambers 26 and 27 depending upon the positioning of valves 11 and 12 in the bore in piston 6. The several hydraulic circuits to accomplish relative motion between cylinder 1 and piston 6 or to lock them against motion are subsequently set forth.

The operation of the motor is as follows: the entire assembly is assumed to be filled with a suitable hydraulic fluid. A source of high pressure fluid is made available at port 20 and a low pressure relief is made available at port 29. Due to the arrangement of the parts, high pressure oil is available in chamber 21 through port 28 and low pressure relief is available in chambers 22 and 23 whatever the position of piston 6 with relation to cylinder 1 may be. As shown in the drawings, the system is in equilibrium with no tendency for relative motion between any of the parts. Any motion of the driven rod 8 with respect to cylinder 1 is prevented by a hydraulic block in chamber 26, passage 24 and closed port 19 and chamber 27, passageway 25 and closed port 18.

The assembly may be mounted on the trunnions 4 and 5 or by other suitable means. For aircraft application the driving rod 10 is connected by linkage to the pilot's or other control and the driven rod 8 is connected by linkage to the airplane control surface or other devices to be operated as previously set forth. If by reason of motion by the operator the driving rod 10 is displaced to the right relative to the rest of the assembly, it will cause the port 19 to be opened into chamber 21 and port 18 to be opened into chamber 22. High pressure fluid will then flow by the route of port 20, chamber 21, port 19, passageway 24, and chamber 26, causing the movement of the driven rod 8 assembly, to the right, the oil in chamber 21 being relieved by the route of chamber 27, passageway 25, port 18, chamber 22, port 16 and port 29 through passageway 29'. The driven rod 8 will continue to move until it has been displaced a distance equal to the original displacement of the driving rod 10 at which time the ports 19 and 18 will again be closed and motion will cease. At that new position of the driven rod it will be restrained against any movement by the hydraulic block described above. Similarly, any displacement of the driving rod 10 to the left will cause an equal displacement of the driven rod 8 to the left and a locking of the driven rod in the new position. The driven rod 8 will be automatically moved to the position of the driving rod 10 at any place in the travel of the piston and will be locked irreversibly in such position.

Provision may be made for manual operation of the controls without power in the event of a hydraulic power failure by providing the by-pass 30, external to the device, between the high and the low pressure systems with a check valve 31 against the high pressure side. In the event a displacement of the driving rod to the right occurs, it would continue until the right hand valve 12 had closed the port 17 at which time a hydraulic block between 6, 10 and 8 would force the driven rod 8 to move under the power supplied by the driving rod. The hydraulic fluid would then flow from chamber 27 through passageway 25, port 18, chamber 22, port 16 and outlet port 29 through the by-pass 30 and check valve 31 described above, and back into port 20, chamber 21 through port 28, port 19, passageway 24 and into chamber 26. Although the full loads are transmitted back from the driven rod 8 to the driving rod 10, in this circumstance the driven rod is prevented from violent oscillations of the type encountered in aircraft control surface flutter in that a reverse motion could continue only until the ports 19 and 18 were closed at which time a hydraulic block would stop all motion.

In the event of an hydraulic line failure leading to the loss of fluid, manual operations are continued by means of an elastic connection between the driving rod 10 and the driven rod 8 by means of the springs 14 and 15 for small displacements and direct connection between the driving and driven rods when displacements are large.

What I claim is:

1. A fluid motor comprising a cylinder; a piston having a chamber therein and movable in said cylinder, said piston forming a chamber in each end of said cylinder; valve means in said piston chamber; means through which pressure fluid is introduced into said piston chamber including a passageway and a port in said piston communicating with a port in said cylinder; means for establishing separate communication channels between said piston chamber and the chambers in said cylinder, each of said communication channels including ports in said piston; means for adjusting said valve means in said piston so that fluid will selectively flow into one of said cylinder chambers, said valve means when in neutral position in said piston chamber preventing flow of fluid through said ports into said cylinder chambers, thereby locking said piston in position in said cylinder; and resilient means for restoring said valve to neutral position after each actuation of said valve.

2. A fluid motor comprising a cylinder; a piston movable in said cylinder and provided with a chamber, said piston forming a chamber in each end of said cylinder; means for introducing fluid into said piston chamber including a passageway and a port in said piston communicating with a port in said cylinder; valve means in said piston chamber; separate means for establishing communication between said piston chamber and the chambers in each end of said cylinder which includes port means in said piston; resilient means in said piston chamber for holding said valve means in position for preventing passage of fluid to said cylinder chambers and for restoring said valve to neutral position following each actuation thereof; and means for moving said valve means for selectively directing the flow of pressure fluid to said cylinder chambers.

3. A device as defined in claim 2 which includes means for preventing relative rotation between said piston and said cylinder.

4. A fluid motor comprising a cylinder; a piston movable in said cylinder and provided with a chamber, said piston forming a chamber in each end of said cylinder; means for introducing pressure fluid into said piston chamber; separate means for establishing communication between said piston chamber and each of said cylinder chambers; valve means in said piston chamber; means for positioning said valve means in said piston chamber for preventing the flow of pressure fluid therefrom and for locking said piston and cylinder against relative movement; means for actuating said valve means for enabling pressure fluid to be selectively directed into either of said cylinder chambers; and means for by-passing said valve means for enabling said piston to be manually moved by said valve actuating means.

5. A fluid motor comprising a cylinder; a piston in said cylinder and having a chamber therein, said piston forming a chamber in each end of said cylinder; a pair of valve means in said chamber; a rod on which said pair of valve means is mounted and extending through said piston and cylinder for enabling the valve means to be manually adjusted; means through which pressure fluid is introduced into said piston chamber; separate means for establishing communication between said piston chamber and each of said cylinder chambers; and a pair of springs in said piston chamber arranged therein for holding said valves in neutral position whereby said piston and cylinder are locked in position, said springs, when selectively lightly manually compressed, moving said piston through small increments of movement and when selectively completely compressed by said rod, enabling said piston to be manually moved in the absence of pressure fluid from said piston and cylinder.

6. A fluid motor comprising a cylinder; a piston movable in said cylinder and provided with a chamber, said piston forming a chamber in each end of said cylinder; means for introducing fluid into said piston chamber; valve means in said piston chamber; separate means for establishing communication between said piston chamber and the chambers in each end of said cylinder; means in said piston chamber for holding said valve means in position for preventing passage of fluid to said cylinder chambers; and means for moving said valve means for selectively directing the flow of pressure fluid to said cylinder chambers.

7. A pressure fluid motor comprising a cylinder; a bored piston movably mounted in said cylinder and provided with a plurality of ports; a rod secured in one end of said piston that extends through one end of said cylinder; a rod secured to the other end of said piston relatively movable with respect to said piston and extending through the other end of said cylinder; valve means mounted on said second mentioned rod and disposed in the bore in said piston, said valve means adjustably mounted in the bore and cooperating with the ports in said piston for controlling the motion of said cylinder relative to said piston when said cylinder or said second mentioned rod is actuated, said valve means when in neutral position locking said piston in position; and resilient means acting on said valve for restoring it to neutral position following each actuation thereof.

8. A pressure fluid motor comprising a cylinder; a bored piston reciprocably mounted in said cylinder and provided with a plurality of ports; a rod secured to one end of said piston that extends through one end of said cylinder; a rod in the other end of said piston relatively movable with respect to said piston and extending through the other end of said cylinder; adjustable valve means mounted on said second mentioned rod and movably disposed in the bore of said piston, said valve means cooperating with the ports in said piston for selectively admitting pressure fluid to either end of said cylinder for producing relative axial motion between said cylinder and piston when said cylinder or said second mentioned rod is actuated, said valve means also cooperating with the ports in said piston for locking said cylinder and piston against axial motion relative to each other in the event of failure of pressure fluid supply to the motor; and resilient means acting on said valve for restoring it to neutral position following each actuation thereof.

ROBERT J. BALDWIN.

REFERENCES CITED

The following references are of record in the file of this patent:

UNITED STATES PATENTS

| Number | Name | Date |
| --- | --- | --- |
| 1,790,620 | Davis | Jan. 27, 1931 |
| 1,821,502 | Ellis | Sept. 1, 1931 |
| 1,851,816 | Dieter | Mar. 29, 1932 |
| 1,874,248 | Davis | Aug. 30, 1932 |